United States Patent [19]

Hoff et al.

[11] 4,041,224

[45] Aug. 9, 1977

[54] CATALYST, METHOD AND POLYMERIZATION PROCESSES

[75] Inventors: Raymond E. Hoff, Palatine; Thomas J. Pullukat, Hoffman Estates; Mitsuzo Shida, Barrington, all of Ill.

[73] Assignee: Chemplex Company, Rolling Meadows, Ill.

[21] Appl. No.: 633,507

[22] Filed: Nov. 19, 1975

[51] Int. Cl.² .................. C08F 4/24; C08F 10/00
[52] U.S. Cl. .................. 526/96; 252/430; 252/469; 526/106; 526/352
[58] Field of Search ........ 526/96, 106; 252/430, 252/469

[56] References Cited

U.S. PATENT DOCUMENTS

| | | | |
|---|---|---|---|
| 2,825,721 | 3/1958 | Hogan et al. | 526/106 |
| 3,485,771 | 12/1969 | Horvath | 526/96 |
| 3,622,521 | 11/1971 | Hogan et al. | 526/96 |
| 3,625,864 | 12/1971 | Horvath | 526/106 |
| 3,780,011 | 12/1973 | Pullukat et al. | 526/96 |
| 3,798,202 | 3/1974 | Nasser, Jr. | 526/96 |
| 3,879,362 | 4/1975 | Chalfont et al. | 526/113 |
| 3,882,096 | 5/1975 | Shida et al. | 526/96 |
| 3,970,613 | 7/1976 | Goldie et al. | 526/106 |
| 3,976,632 | 8/1976 | Delap | 526/96 |

Primary Examiner—Alan Holler
Attorney, Agent, or Firm—Wegner, Stellman, McCord, Wiles & Wood

[57] ABSTRACT

A catalyst prepared by (1) forming a mixture of a finely divided support such as silica, alumina, zirconia or thoria and a chromium compound which may be either organic or inorganic followed by (2) adding a titanium compound, then (3) heat activating the reaction product of (2), and then (4) further heating in a gas that comprises oxygen. The disclosure also includes a method of polymerizing olefins with this catalyst and the process of preparing the catalyst.

36 Claims, No Drawings

CATALYST, METHOD AND POLYMERIZATION PROCESSES

BACKGROUND OF THE INVENTION

This invention relates to a new catalyst made by a modification of the methods described in Pullukat et al. U.S. Pat. No. 3,780,011 which is assigned to the assignee hereof. The modification comprises the thermal activation step. In the method of U.S. Pat. No. 3,780,011 a catalyst is made by the addition of an alkyl ester of titanium to a dry, intimate mixture of chromium oxide and a support such as silica, followed by activation in a dry gas containing oxygen. The new catalyst of this invention can be made by following this method except that after the addition of the titanium ester the composite is given two separate thermal treatments. The first thermal treatment is in an inert or reducing (non-oxidizing) gas and the second is in an oxidizing gas such as air. This invention is also an extension of U.S. Pat. No. 3,780,011 in that the modified catalysts of this invention can be made from various chromium compounds.

SUMMARY OF THE INVENTION

The new catalyst produced by this invention provides a means to make polyethylene of greatly increased melt index (ASTM D-1238 52T) at higher productivities than heretofore possible. In a solution form process, wax-like material with melt index values greater than 1,000 can be made. But the inventors believe that the most important use for this new catalyst is in the economical particle form process which, as a consequence of this invention, can now be employed for the manufacture of very high melt index polymers. With the usual chromium oxide catalysts, such products have been possible only in the solution form process. In the particle form (PF) process the polymerization is carried out in the presence of an inert hydrocarbon solvent in which the polymer is insoluble, the solvent acting as a heat control and transfer medium, a means of obtaining good dispersion of the catalyst, and a carrier for the resulting polymer.

The catalysts of this invention which are used in both the method and processes of this invention are prepared by depositing on a finely divided, difficulty reducible, inorganic oxide support that may be either silica, alumina, zirconia, thoria or a mixture or composite thereof a chromium compound that may be either organic or inorganic followed by adding a titanium compound to the mixture of support and chromium compound and then heat activating this product followed by heating in a gas that comprises oxygen of which air is an excellent example.

Preferably, the supports are porous with large surface areas for the adsorption and/or deposition of the chromium compound with the surface areas preferably being from 50-1000 square meters per gram. Any grade of support can be used herein, but the microspheroidal intermediate density (MSID) silica is preferred for the highest melt index increase. This grade has a surface area of 258 square meters per gram and a pore diameter of about 288 A., although the intermediate density (ID) silica having the same area but a pore diameter of 164 A. also affords greatly increased melt index and may be preferred in some cases. Other grades such as th G-968 silica and G-966 silica-alumina, as designated by the W. R. Grace Co., having surface areas of 700 and 500 square meters per gram, respectively, and pore diameters of 50-70 A. are also quite satisfactory. Variations in molecular weight control, particle size of the polymer in the particle form process, and in polymer productivity can be expected between different grades of supports.

Although chromium trioxide is an excellent chromium compound for the preparation of this new catalyst, other compounds are equally suitable. Inorganic salts of trivalent and hexavalent chromium are examples of water soluble, inorganic compounds. The carboxylic acid salts such as chromic acetate and chromic tartrate are further examples of water soluble compounds. On the other hand, the chromium compound can be insoluble in water such as the tetravalent chromium tetra-t-butoxide. The reaction product of ammonium chromate and pinacol of the type described in Hoff et al. patent application Ser. No. 517,544, filed Oct. 24, 1974, and assigned to the assignee hereof, can also be used. In general, the chromium compounds which are preferred are those which contain in addition to chromium, only oxygen, and thermally degradable or volatile substituents. Such chromium compounds can be mixed with the support in any effective manner such as aqueous or organic solvent impregnation, melt coating, or dry mixing.

DESCRIPTION OF THE PREFERRED EMBODIMENTS

In preparing the catalyst of this invention, a catalyst support of the type discussed above (of which silica is an excellent example) is mixed with the desired proportion of chromium compound and this mixture is then dried by fluidizing at an elevated temperature in a catalyst activator using dry nitrogen or dry air. Then to the fluidized bed at catalysts at the drying temperature used, a titanium compound is introduced. The drying time and temperature are selected to be sufficient to remove any surface water or other liquids. In general, 200° to 400° F. for 15 minutes to 2 hours or longer is preferred depending upon the size and flow conditions of the activator. In most cases, 350° F. is an ideal drying temperature.

The amount of chromium compound is preferably such to incorporate between 0.1 and 10 weight percent chromium into the catalyst. A catalyst composition containing 1 weight percent chromium is highly active; consequently, there is ordinarily no reason to use a larger percent.

The titanium compounds useful for this invention may be selected from the following formulas:

titanium acetyl acetonate compounds,
alkanolamine titanates in which $m$ is 1, 2, 3, or 4, $n$ is 0, 1, 2 or 3 and $m$ plus $n$ equals 4; and R is selected from alkyl, aryl, cycloalkyl and alkaryl, each group having 1 to 12 carbon atoms; R' is selected from the group consisting of R, cyclopentadienyl and alkenyl, for example ethenyl, propenyl and isopropenyl, each group having 1 to 12 carbon atoms. When more than one R (or R') group occurs in the titanium compound, the groups can be the same or different. Titanium compounds represented by the formula $(RO)_4Ti$ are preferred, particularly the alkyl compounds having from 1 to 6 carbon atoms in each alkyl group, for example tetraethyl titanate and tetraisopropyltitanate. The titanium acetyl acetonate compound can be, for example, titanium diacetylacetonate di-isopropylate, or the so-called "titanium acetyl acetonate", "titanyl acetyl acetonate." The alkanolamine titanate can be, for example, triethanolamine titanate.

The quantity of titanium compound used in the process of the present invention is suitably in the range 0.5–8.0 % based on the weight of the support material, and preferably in the range of 2.0–6.0%. Evidence indicates that upon addition of the titanium compound a reaction occurs between the chromium compound and the titanium compound. Thus the occurrence of such a reaction is evident from the color change that occurs at this point. The color is an indication of the valence state and chemical coordination of the chromium. If the chromium compound is hexavalent, it is completely reduced by reaction at this stage with the preferred titanium esters, for example, tetraisopropyl titanate. This reduction can be shown by chemical analysis using a standard iodometric method. It is believed that the reactions which occur at this stage involve every chromium atom in at least one bond to a titanium atom through an oxide bridge:

Cr — O — Ti

These structures remain intact during subsequent thermal treatment and are believed to account for the unique character of the catalysts.

Suitably the titanium compound is mixed in the absence of moisture with the support and chromium compound. This may be achieved in any convenient manner, for example, by dry mixing, by ball milling, or by incorporating the titanium compound as a solid, liquid or vapor into a fluidized bed of the support material, for example, by passing the vapor of the titanium compound into the fluidizing gas. It is preferred that solvents which may interfere in the reaction of chromium with titanium be avoided.

The composition formed by the support, the chromium compound and the titanium compound is heated at a temperature from 300° to 900° C. in an inert or reducing gas for a period of time that can range from a few minutes to several hours. The most preferable temperature range is 600°–750° C. This heat activating of the mixture of support, chromium compound and titanium compound is preferably done with the drying gas being a reducing atmosphere gas such as a mixture of nitrogen and carbon monoxide.

Following the first step of activation, the catalyst is subjected to a partial oxidation. This partial oxidation may be accomplished by fluidization with a gas which contains oxygen, for example, air. The preferred temperature for this partial oxidation step is within the range of 450°–550° C. for maximum melt index values, although higher and lower temperatures can be used which give melt index increases less than the maximum. The duration of the partial oxidation step can be from 5 minutes to 2 or 3 hours, although 15 minutes is generally as effective as longer durations.

The improved catalysts prepared according to this invention may be used to polymerize 1-olefins of 2–8 carbon atoms and copolymers of said olefins and 1-olefins of 2–20 carbon atoms in liquid phase, or vapor phase processes. These processes may be either batch or continuous. The mode of charging catalyst, olefin, and solvent if required, to the reactor system may follow any conventional practice applicable to batch or continuous operation. Normally, agitation is provided in the reactor as well as a means to remove the heat of polymerization and a means to control the reactor temperature. In liquid phase processes, olefin polymer is normally recovered by flashing-off solvent without any intervening steps for removal of the catalyst. The activity of the catalysts described in this invention is high so that catalyst removal for practical purposes is unnecessary. Reactor conditions are dependent on the type of olefin as well as the desired polymer properties. In the case of ethylene, reactor pressures may range from 50 to 1000 psig, temperatures from 150° to 500° F. and solids levels from 5–40% by weight. The following examples all relate to the polymerization of ethylene.

EXAMPLE 1

A series of catalysts was prepared using Davison Chemical Company Grade 969MS (2% $CrO_3$ on silica). Each catalyst was made by drying 8 g. at 170° C. for 1 hour in a 1 inch diameter quartz tube. The catalyst was retained on a fritted disc and nitrogen at 300 $cm^3$/min. was passed upward through the catalyst to produce fluidization. After drying 2.1 ml of titanium tetraisopropoxide was added to the fluidized bed by means of a syringe and long needle. After the addition of the titanium ester, each catalyst was activated in a gas mixture of 7% carbon monoxide and 93% nitrogen by volume at 700° C. The time of activation was 4.75 hours. Each catalyst was then adjusted to a desired air treatment temperature. The carbon monoxide was shut off and the catalyst bed purged for 30 minutes with pure nitrogen. Each catalyst was then given an air treatment of 15 minutes duration after which it was cooled under nitrogen. Samples of each catalyst were then tested in polymerizing ethylene in a laboratory polymerization reactor with 500 ml of isobutane as solvent at a total pressure of 550 psig and a temperature of 221° F. The results of this series show the effect of the air treatment upon melt index and can be found in Table 1

Table 1

| The Effect of Air Treatment Temperature on MI | | | |
|---|---|---|---|
| Air Temp. °C. | Reactivity g/g/hr. | Productivity g/g | MI at 221° F. |
| 700 | 2150 | 2350 | 3.3 |
| 550 | 2227 | 2227 | 47.8 |
| 500 | 2484 | 2484 | 39.5 |
| 500 | 2700 | 2030 | 53.5 |
| 500 | 2060 | 5140 | 38.6 |
| 450 | 1852 | 2469 | 44.7 |
| 400 | 1167 | 1945 | 9.7 |

EXAMPLE 2

A catalyst was made in the same manner as Example 1 except that during the first thermal activation step pure nitrogen was used. The air treatment temperature was 500° C. The melt index was 13.6 at a productivity of 1700 and equal reactivity. This example shows the advantage of a reducing atmosphere over an inert atmosphere.

EXAMPLE 3

A series of three catalysts was made as described in Example 1 except that the starting material was Davison Chemical Company Grade 969ID (2% $CrO_3$ on silica). Each catalyst was given an air treatment at a different temperature and tested in polymerization as described at 225° F.

| Air Treatment Temp. ° C. | Reactivity g/g/hr. | Productivity g/g | MI at 225° F. |
| --- | --- | --- | --- |
| 400 | 1100 | 1100 | 14.4 |
| 500 | 1490 | 1490 | 38.3 |
| 600 | 1640 | 1640 | 4.7 |

This example shows that the intermediate density silica can be utilized and that with the different support, the dependence of air treatment temperature is the same.

EXAMPLE 4

A catalyst was prepared by adding an aqueous solution of chromic nitrate, $Cr(NO_3)_3 \cdot 9H_2O$, to silica. The amount of solution was sufficient to make the chromium content of the silica 1 weight percent. The mixture was dried in the manner of Example 1, treated with the same amount of titanium ester and activated as described in Example 1. The air treatment temperature was 500° C. For the polymerization test with ethylene the temperature was 221° F.

| Reactivity g/g/hr. | productivity g/g | MI at 221° F. |
| --- | --- | --- |
| 3250 | 2710 | 53.5 |
| 3320 | 4150 | 28.3 |

This example shows that for the catalyst of this invention, a trivalent salt is as suitable as the hexavalent chromium trioxide.

EXAMPLE 5

A catalyst similar to Example 4 was made in which the chromium compound was violet chromium tartrate:

| Reactivity g/g/hr. | Productivity g/g | MI at 221° F. |
| --- | --- | --- |
| 2800 | 2800 | 108 |

EXAMPLES 6-10

A series of ammonium chromate-pinacol catalysts of the type described in the above cited Hoff et al. application was prepared. The amount of chromium on each catalyst was 0.8 weight percent added as a water solution of ammonium chromate to a mixture of Davison 952 grade silica and pinacol hexahydrate. The pinacol to chromium molar ratio was 4 to 1. The mixtures were heated at 350° F. for 25 minutes during which water was expelled and the pinacol and ammonium chromate reacted. After this drying, a desired amount of titanium tetraisopropoxide was introduced as described in Example 1. The drying and titanium addition were done while the catalysts were fluidized by dry nitrogen. Each catalyst was then activated at 700° C. in a reducing atmosphere of 7% carbon monoxide and 93% nitrogen. The period of activation was about 5 hours after which the carbon monoxide was shut off. Ten minutes later, air was introduced while the catalysts were simultaneously cooled from 700° to 475° C. during 15 minutes. The air was shut off in each case and the catalyst purged with pure nitrogen. At 400° C. each catalyst was treated with pure carbon monoxide at 300 cm³/min. for 15 minutes. After this, each of the catalysts was cooled under nitrogen fluidization. A sample of each catalyst was tested in ethylene polymerization as described in Example 1. The reaction temperture was 228° F. The results of this series are given in Table 2. These examples show that the melt index depends upon the amount of titanium added to the catalyst, that the ammonium chromatepinacol reaction products can be used as the chromium source, and that the high melt index effect persists through a final reduction step.

Table 2

| Exam. No. | Wt. % Ti | Reactivity g/g/hr. | Productivity g/g | MI at 228° F. |
| --- | --- | --- | --- | --- |
| 6 | 0 | 1575 | 1575 | 0.18 |
| 7 | 0.1 | 1626 | 1627 | 1.32 |
| 8 | 1.7 | 850 | 1850 | 6.1 |
| 9 | 6.5 | 1186 | 1186 | 24.6 |
| 10 | 12.0 | 720 | 2150 | 56.0 |

EXAMPLE 11

A catalyst was made as described in Examples 6-10 except that a benzene solution of chormium tetra-t-butoxide was used in place of the ammonium chromte aqueous solution. The benzene solution was added to the pinacol-silica combination inside an activator tube. The activation procedure and final carbon monoxide treatment were the same as in Examples 6-10. The polymerization reactor test temperature was 225° F.

| Wt. % Ti | Reactivity g/g/hr. | Productivity g/g | MI at 225° F. |
| --- | --- | --- | --- |
| 4.2 | 1175 | 2055 | 14.3 |

EXAMPLES 12-15

Four catalysts were made following the method of Example 1. To each of these four catalysts a quantity of ammonium hexafluorosilicate was added as a dry powder before the 969 MS silica was dried. The catalysts were activated in nitrogen and carbon monoxide and air treated at 500° C. as described in Example 1.

| Exam. No. | Wt. % $(NH_4)_2 Si F_6$ | Activation Temp.° C. | Reactivity g/g/hr. | Productivity g/g | MI |
| --- | --- | --- | --- | --- | --- |
| 12 | 0.75 | 650 | 3200 | 3200 | 14.5* |
| 13 | 1.0 | 680 | 2700 | 3950 | 22.0* |
| 14 | 1.0 | 700 | 1200 | 2130 | 32.0** |
| 15 | 1.5 | 700 | 1100 | 1100 | 5.3** |

*Polymerization Test (MI) Temperature 221° F.
*Polymerization Test (MI) Temperature 225° F.

EXAMPLES 16-22

A series of catalysts of the type described in the above Hoff et al application and in Examples 6-10 was prepared. Each member of the series, after addition of ammonium chromate and pinacol, was heated in a nitrogen atmosphere to 170° C. to promote the reaction of the pinacol with ammonium chromate. At this point, 4.2% titanium in the form of pure liquid titanium tetraisopropoxide was added to the fluidized bed. Each catalyst was then activated as described in the following table. Some of the catalysts were also treated with air after such activation.

Table 3
The Effect of Activation Variables upon Resulting Polymer Melt Index

| Ex. No. | Activation Conditions | Air Treatment | Post CO Treatment | Pzn. T° F. | Productivity g/g | MI at 228° F. |
|---|---|---|---|---|---|---|
| 16 | 840° C., 7% Co + 93% N₂ | None | 600° C., 15 min. | 225 | 211 | 0.28 |
| 17 | 700° C., 7% CO + 93% N₂ | None | None | 215 | 530 | 0.025 |
| 18 | 700° C. — 100% Air | N. A. | None | 225 | 1630 | 3.4 |
| 19 | 700° C., 7% CO + 93% N₂ | 500° C., 15 min. | None | 225 | 893 | 46 |
| 20 | 700° C., 7% Co + 93% N₂ | 500° C., 15 min. | None | 227 | 1000 | 113 |
| 21 | 700° C., 7% CO + 93% N₂ | 500° C., 15 min. | None | 225 | 1720 | 54 |
| 22 | 700° C., 7% Co + 93% N₂ | 300° C., 6 hours | None | 225 | 700 | 11 |

As can be seen from Table 3, the complete omission of the air treatment results in a high density polyethylene resin of low melt index. The catalyst of Example 18 shows that air activation as taught by Hogan and Witt (U.S. Pat. No. 3,622,521) causes only a small increase in melt index. It is furthermore clear that air treatment at 500° C. is preferred to 300° C. when making high melt index polyethylene.

Although various statements of theory of structure, preparation, operation and the like are included herein the invention is not to be limited or restricted by any theory but only by the claims.

We claim:

1. A catalyst prepared by the process of (1) forming a mixture of a finely divided, difficultly reducible, support selected from the group consisting of silica, alumina, zirconia, thoria and mixtures thereof and a chromium compound, followed by (2) adding a titanium compound, then (3) heat activating said product of (2) in an inert or reducing atmosphere, and then (4) partially oxidizing by heating said product (3) in a gas that comprises oxygen.

2. The catalyst of claim 1 wherein said chromium compound is an inorganic compound containing chromium, oxygen and volatile or thermally degradable substituents.

3. The catalyst of claim 1 wherein said chromium compound is organic.

4. The catalyst of claim 1 wherein said heat activating of (3) is at a temperature of about 300°–900° C.

5. The catalyst of claim 4 wherein said heat activating of (3) is concurrent with fluidizing said mixture in a non-oxidizing gas stream.

6. The catalyst of claim 5 wherein said fluidizing is in a reducing gas stream.

7. The catalyst of claim 6 wherein said reducing gas comprises a mixture of nitrogen and carbon monoxide.

8. The catalyst of claim 1 wherein said heat activating of (3) and heating of (4) are each accomplished while fluidizing the respective mixtures.

9. The catalyst of claim 1 wherein said gas comprises air.

10. The catalyst of claim 1 wherein the product of (2) is dried at from about 200°–400° F. for from about 15 minutes to 2 hours.

11. The catalyst of claim 1 wherein said chromium compound is present in an amount to produce about 0.1–10 wt.% chromium and said titanium compound is present in an amount to produce about 0.5–8.0 wt.% titanium, both based on the amount of said support.

12. The catalyst of claim 1 wherein said heating of (4) is at about 450°–550° C. for about 5 minutes – 2 hours.

13. The method of making polymers of 1-olefins of 2–8 carbon atoms and copolymers of said olefins and 1-olefins of 2–20 carbon atoms which comprises polymerizing said olefins under polymerizing conditions with the catalyst of claim 1.

14. The method of making polymers of 1-olefins of 2–8 carbon atoms and copolymers of said olefins and 1-olefins of 2–20 carbon atoms which comprises polymerizing said olefins under polymerizing conditions with the catalyst of claim 2.

15. The method of making polymers of 1-olefins of 2–8 carbon atoms and copolymers of said olefins and 1-olefins of 2–20 carbon atoms which comprises polymerizing said olefins under polymerizing conditions with the catalyst of claim 3.

16. The method of making polymers of 1-olefins of 2–8 carbon atoms and copolymers of said olefins and 1-olefins of 2–20 carbon atoms which comprises polymerizing said olefins under polymerizing conditions with the catalyst of claim 4.

17. The method of making polymers of 1-olefins of 2–8 carbon atoms and copolymers of said olefins and 1-olefins of 2–20 carbon atoms which comprises polymerizing said olefins under polymerizing conditions with the catalyst of claim 5.

18. The method of making polymers of 1-olefins of 2–8 carbon atoms and copolymers of said olefins and 1-olefins of 2–20 carbon atoms which comprises polymerizing said olefins under polymerizing conditions with the catalyst of claim 6.

19. The method of making polymers of 1-olefins of 2–8 carbon atoms and copolymers of said olefins and 1-olefins of 2–20 carbon atoms which comprises polymerizing said olefins under polymerizing conditions with the catalyst of claim 7.

20. The method of making polymers of 1-olefins of 2–8 carbon atoms and copolymers of said olefins and 1-olefins of 2–20 carbon atoms which comprises polymerizing said olefins under polymerizing conditions with the catalyst of claim 8.

21. The method of making polymers of 1-olefins of 2–8 carbon atoms and copolymers of said olefins and 1-olefins of 2–20 carbon atoms which comprises polymerizing said olefins under polymerizing conditions with the catalyst of claim 9.

22. The method of making polymers of 1-olefins of 2–8 carbon atoms and copolymers of said olefins and 1-olefins of 2–20 carbon atoms which comprises polymerizing said olefins under polymerizing conditions with the catalyst of claim 10.

23. The method of making polymers of 1-olefins of 2–8 carbon atoms and copolymers of said olefins and 1-olefins of 2–20 carbon atoms which comprises polymerizing said olefins under polymerizing conditions with the catalyst of claim 11.

24. The method of making polymers of 1-olefins of 2–8 carbon atoms and copolymers of said olefins and 1-olefins of 2–20 carbon atoms which comprises polymerizing said olefins under polymerizing conditions with the catalyst of claim 12.

25. The process of preparing an active polymerizing catalyst, comprising: (1) forming a mixture of a finely divided, difficultly reducible, support selected from the group consisting of silica, alumina, zirconia, thoria and mixtures thereof and a chromium compound, followed by (2) adding a titanium compound, then (3) heat activating said product of (2) in an inert or reducing atmosphere, and then (4) heating in a gas that comprises oxygen.

26. The process of claim 25 wherein said chromium compound is an inorganic compound containing chromium, oxygen and volatile or thermally degradable substituents.

27. The process of claim 25 wherein said chromium compound is organic.

28. The process of claim 25 wherein said heat activating of (3) is at a temperature of about 300°–900° C.

29. The process of claim 28 wherein said heat activating of (3) is concurrent with fluidizing said mixture in a gas stream.

30. The process of claim 29 wherein said fluidizing is in a reducing gas stream.

31. The process of claim 30 wherein said reducing gas comprises a mixture of nitrogen and carbon monoxide.

32. The process of claim 25 wherein said heat activating of (3) and heating of (4) are accomplished while fluidizing the respective mixtures.

33. The process of claim 25 wherein said gas comprises air.

34. The process of claim 25 wherein the product of (2) is dried at from about 200°–400° F. for from about 15 minutes – 2 hours.

35. The process of claim 25 wherein said chromium compound is present in an amount to produce about 0.1–10 wt.% chromium and said titanium compound is present in an amount to produce about 0.5–8.0 wt.% titanium, both based on the amount of said support.

36. The process of claim 25 wherein said heating of (4) is at about 450°–550° C. for about 5 minutes – 2 hours.

* * * * *